(12) United States Patent
Wong et al.

(10) Patent No.: US 6,428,906 B1
(45) Date of Patent: Aug. 6, 2002

(54) MAGNETIC RECORDING MEDIA HAVING A LAYERED STRUCTURE FOR PERPENDICULAR MAGNETIZATION OF A RECORDING LAYER

(75) Inventors: Bunsen Y. Wong, San Diego; Lan Zhang, Fremont, both of CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/583,317

(22) Filed: May 30, 2000

(51) Int. Cl.[7] .................................................. G11B 5/64
(52) U.S. Cl. ........................ 428/611; 428/650; 428/668; 428/694 TS; 204/192.2
(58) Field of Search ................................. 428/611, 660, 428/663, 666–668, 694 TS, 900, 650; 204/192.2

(56) References Cited

U.S. PATENT DOCUMENTS

| | | | |
|---|---|---|---|
| 4,652,499 A | | 3/1987 | Howard ....................... 428/641 |
| 5,131,995 A | * | 7/1992 | Suenaga et al. ........ 204/192.16 |
| 5,693,426 A | | 12/1997 | Lee et al. .................... 428/611 |
| 5,718,811 A | * | 2/1998 | Chen et al. ................ 204/192.2 |
| 5,989,728 A | * | 11/1999 | Coffey et al. ............... 428/611 |
| 6,068,739 A | * | 5/2000 | Suzuki et al. ............... 117/105 |
| 6,218,028 B1 | * | 4/2001 | Song et al. .................. 428/611 |
| 6,248,416 B1 | * | 6/2001 | Lambeth et al. ............ 360/135 |

FOREIGN PATENT DOCUMENTS

JP       03-193851 A   *  8/1991
JP       11-213371 A   *  8/1999

OTHER PUBLICATIONS

Document Titled Site Preferences of Substitutional Si, Nb, Mo, Ta, and W Solid Solutions in L10 TiAl (Mar. 18, 1998).*
JPO Abstract Translation of JP–11–213371–A (Clipped Image No. JP411213371A).*
Machine Assisted Translation of JP 11–213371–A.*
Document Titled "PAC study of annealed TiAl" (no date given).*
Document Titled The CuAl (L10) Structure (last modified Apr. 5, 2001).*
Lambeth, David N. et al., "Magnetic Media Performance: Control Methods for Crystalline Texture and Orientation", submitted for Publication in MRS Proceedings MRS Sym L: Paper #L8.1, Apr. 11 15, 1998 (Jun. 1, 1998), 12 pp.
Derwent Translation of JP 03–193851A (Derwent document number 4031935851A).*

* cited by examiner

Primary Examiner—Stevan A. Resan
Assistant Examiner—Kevin M Bernatz
(74) Attorney, Agent, or Firm—David M. Sigmond

(57) ABSTRACT

A magnetic recording medium such as a magnetic disk comprises a substrate of NiP or ceramic glass on which is sputtered an underlayer of TiAl or other alloy which has a $L1_0$ structure or a disordered fcc structure. A magnetic layer of a cobalt alloy is then sputtered on the underlayer with the magnetic layer having a magnetization which is perpendicular to the layer. A carbon overcoat can be sputtered on the cobalt alloy magnetic layer with a lubricant layer deposited on the carbon overcoat.

70 Claims, 2 Drawing Sheets

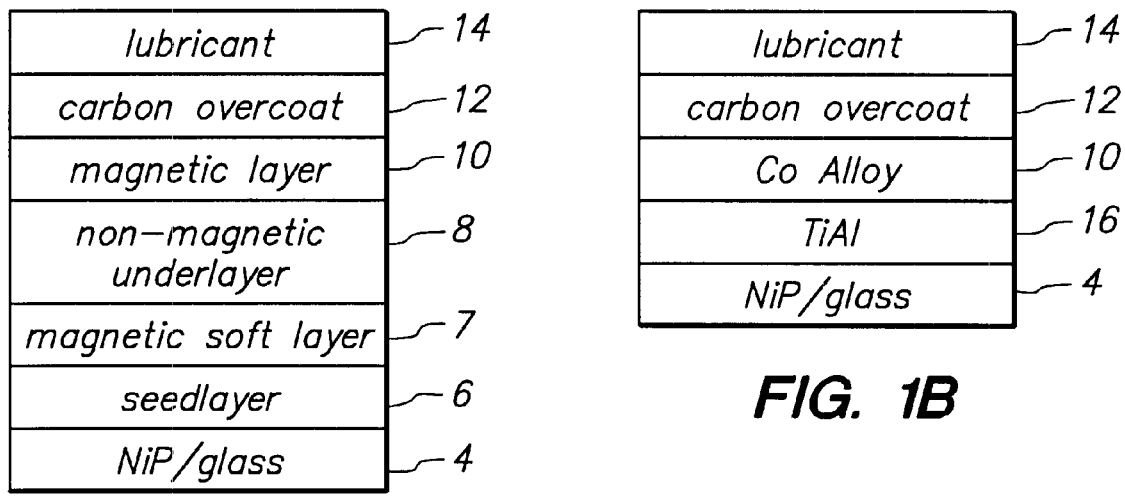
FIG. 1A
FIG. 1B
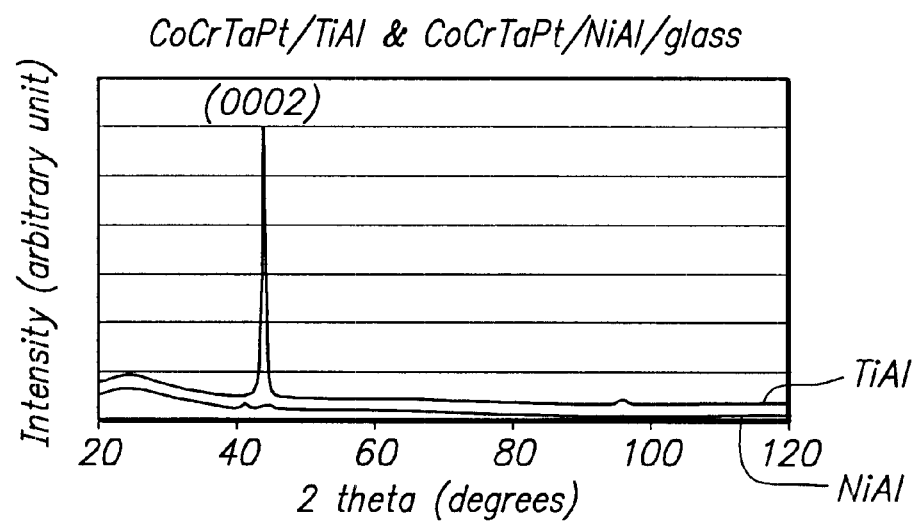
FIG. 2

MAGNETIC RECORDING MEDIA HAVING A LAYERED STRUCTURE FOR PERPENDICULAR MAGNETIZATION OF A RECORDING LAYER

BACKGROUND OF THE INVENTION

This invention relates generally to magnetic recording media such as magnetic thin film recording disks, and more particularly the invention relates to a magnetic recording media structure comprising a plurality of sputtered layers for achieving recording properties perpendicular to the plane of the media The magnetic disk drive as used for data storage in computer systems comprises one or more disks having thin film magnetic layers on opposing surfaces for the recording of magnetic data as bits along concentric tracks. Typically, as shown in FIG. 1A, the disk comprises a substrate 4 of nickel phosphorous (NiP) or ceramic glass on which a plurality of layers are formed by sputtering in a low pressure inert gas atmosphere. The layers include a non-magnetic seedlayer 6, a non-magnetic underlayer 8 of either pure chromium (Cr) or a chrome alloy (CrX), covered by a magnetic layer 10 of a cobalt-(Co) based alloy. A protective layer 12 of sputtered carbon (C) is typically used on top of the magnetic layer and an organic lubricant 14 may be used on top of the protective layer.

The magnetic layer can be either longitudinally magnetized in the plane of the layer or perpendicularly magnetized perpendicular to the plane of the layer. For perpendicular recording, a magnetically soft layer 7, for example, NiFe, is often added to provide an image effect for the writing process. To achieve optimal perpendicular recording properties, the Co alloy magnetic layer has its easy axis magnetization aligned perpendicular to the plane of the disk. To achieve this, an underlayer such as close packed hexagonal (hcp) Ti or TiCr can be deposited to promote the growth of a hcp Co alloy perpendicular to the plane.

The present invention is directed to achieving an improved perpendicular magnetized magnetic layer through use of a reduced number of sputtered underlayers.

SUMMARY OF THE INVENTION

In accordance with the invention, a magnetic recording medium such as a magnetic disk comprises a substrate, an underlayer supported by the substrate with the underlayer preferably having a $L1_0$ lattice structure, and a magnetic layer comprising an alloy of cobalt deposited on the underlayer and having a magnetization which is perpendicular to the magnetic layer.

In a preferred embodiment of the invention, the underlayer is titanium aluminum (TiAl) and the substrate comprises nickel phosphorous (NiP) or ceramic glass. The magnetic layer comprises a cobalt alloy such as CoCrTaPt or CoCrPtB.

While a carbon overcoat and lubricant layer may be included in the recording medium structure, the need for a magnetic soft layer or a non-magnetic underlayer of chromium is obviated. In other embodiments, the $L1_0$ structure can be provided by alloys of other elements, and a disordered fcc structure can be employed, rather than the $L1_0$ lattice.

The invention and objects and features thereof will be more readily apparent from the following detailed description and appended claims when taken with the drawing.

BRIEF DESCRIPTION OF THE DRAWINGS

FIG. 1A is a schematic of the multiple layers in a conventional thin film disk for perpendicular magnetic recording.

FIG. 1B is a schematic of a thin film disk for perpendicular recording in accordance with one embodiment of the present invention.

FIG. 2 is a plot of crystal orientation of a cobalt alloy (CoCrTaPt) on TiAl and on NiAl, respectively, illustrating the enhancement of the (0002) orientation of the cobalt alloy magnetic layer.

DETAILED DESCRIPTION OF ILLUSTRATIVE EMBODIMENTS

Figure 3:
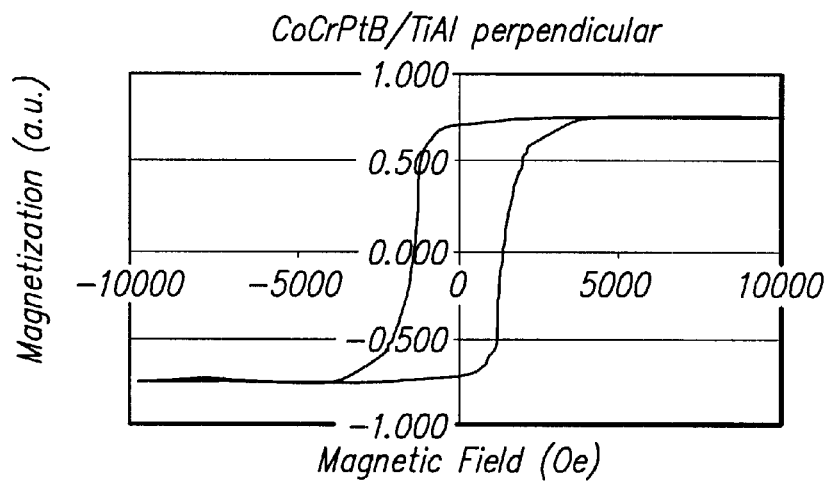
FIG. 3 is a plot of the perpendicular hysteresis loop for a magnetic structure in accordance with the invention.

FIG. 1B is a schematic of a multilayer magnetic recording disk in accordance with an embodiment of the present invention. Like elements in the schematics of FIG. 1A (prior art) and FIG. 1B (invention embodiment) have the same reference numerals. Again, a NiP/glass substrate 4 is provided on which is formed a TiAl seedlayer 16 which has a $L1_0$ lattice structure. The magnetic soft layer 7 and non-magnetic underlayer 8 of FIG. 1A are not required in the embodiment of the present invention. The cobalt alloy magnetic film 10 is sputtered directly on the TiAl layer 16 which facilitates the (0002) orientation of the cobalt alloy magnetic layer as is illustrated in the plot of FIG. 2. A carbon overcoat layer 12 and lubricant layer 14 are applied over the magnetic layer 10 as in the prior art.

Referring to FIG. 2, the XRD of a CoCrTaPt film as deposited on a layer of TiAl and on a layer of NiAl seedlayers, respectively, is illustrated. It will be noted that the vertical crystal orientation of the cobalt alloy layer has a sharp peak at (0002) for the cobalt alloy on the TiAl layer, whereas the crystalline orientation of the cobalt alloy magnetic layer on the NiAl layer remains essentially flat, which shows no preferred orientation.

As a result of the (0002) orientation of the cobalt magnetic layer as shown in FIG. 2, a strong perpendicular magnetic anisotropy is developed. A perpendicular magnetic hysteresis loop is illustrated in FIG. 3 for the cobalt alloy magnetic layer which shows a steep slope between the two magnetic states. The hard axis In-plane loop is shown in FIG. 4 which has a lesser slope and a weaker hysteresis loop.

Figure 4:
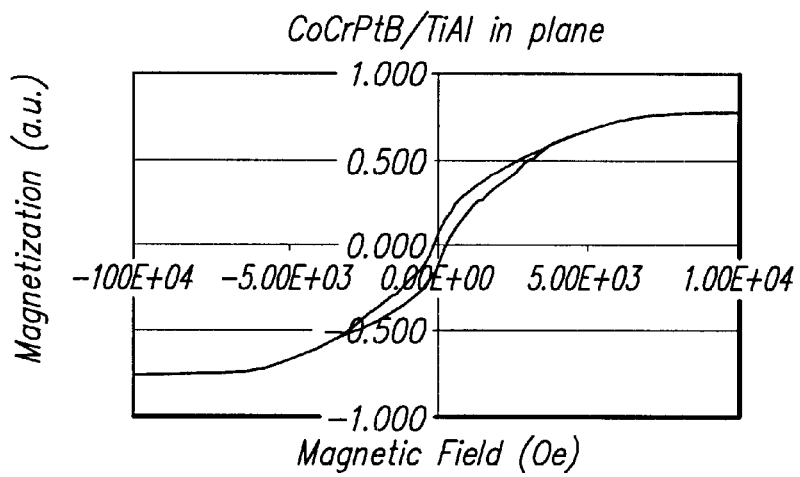
FIG. 4 is a plot of the In-plane hysteresis loop for the material in FIG. 3.

The magnetic properties along the two directions illustrated in FIGS. 3 and 4 are shown in the following table which reflects the strong influence of TiAl in inducing a perpendicular anisotropy.

TABLE 1

|  | Mrt | Hc (Oe) | S |
|---|---|---|---|
| Perpendicular | 0.716 | 1405 | 0.917 |
| In-Plane | 0.088 | 187 | 0.113 |

It will be noted from the above table that the coercivity (Hr), the remanence (Mrt) and the transition region (S*) are greatly enhanced in the perpendicular anisotropy as compared to the easy axis In-plane characteristics.

Figure 5:
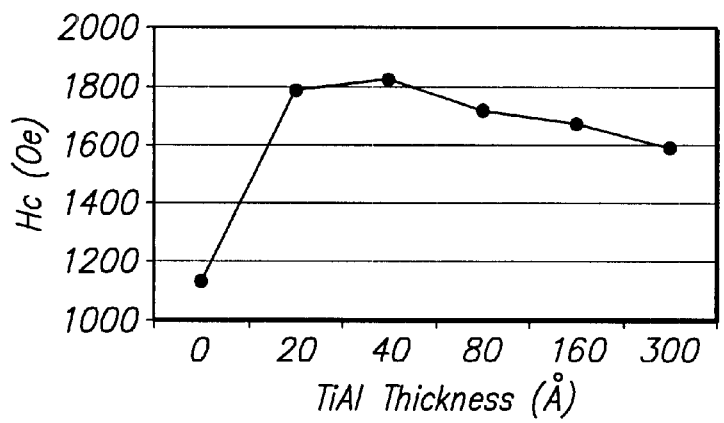
FIG. 5 is a plot illustrating the effect of a TiAl layer thickness on the perpendicular coercivity of a cobalt alloy film (CoCrPtB).

FIG. 5 is a plot illustrating the effect of TiAl layer thickness (angstroms) on perpendicular coercivity of the film. It is noted that only a thin layer of TiAl is required to realize the enhanced effect in the TiAl layer.

While the described embodiment utilizing the TiAl underlayer preferably has a $L1_0$ structure, a disordered face center cubic (fcc) structure also has positive effects on the perpendicular magnetic properties. Further, other alloys which have a $L1_0$ structure can be employed including TiAl, NiMn, NiPt, MnPt, MnZn, IrMn, FePt, FePd, FeNi, CrPt, CrPd, CoPt, CoPd, MnAl, CuAu and CuTi.

Thus, while the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A magnetic recording medium, comprising:
    a substrate;
    a titanium aluminum (TiAl) underlayer supported by the substrate, the underlayer having a $L1_0$ lattice structure; and
    a magnetic layer comprising an alloy of cobalt on and in contact with the underlayer, the magnetic layer having a magnetization which is perpendicular to the layer.

2. The magnetic recording medium as defined by claim 1 wherein the magnetic layer comprises CoCrTaPt.

3. The magnetic recording medium as defined by claim 1 wherein the magnetic layer comprises CoCrPtB.

4. The magnetic recording medium as defined by claim 1 wherein the substrate is selected from the group consisting of NiP and ceramic glass.

5. The magnetic recording medium defined by claim 1 and further including a carbon protective layer on the magnetic layer and a lubricant layer on the protective layer.

6. A method of fabricating a magnetic recording medium, comprising the steps of:
    a) providing a substrate of a material selected from the group consisting of NiP and ceramic glass;
    b) sputtering a titanium aluminum (TiAl) underlayer on and in contact with the substrate; and
    c) sputtering a magnetic layer comprising an alloy of cobalt on and in contact with the underlayer, the magnetic layer having a magnetization which is perpendicular to the layer.

7. The method as defined by claim 6 wherein step b) provides an underlayer having a $L1_0$ lattice structure.

8. The method as defined by claim 6 wherein step b) provides an underlayer having a disordered fcc structure.

9. The method as defined by claim 6 and further including the step of:
    d) depositing a carbon protective layer on the magnetic layer.

10. The method as defined by claim 9 and further including the step of:
    e) depositing a lubricant layer on the carbon protective layer.

11. A magnetic recording medium, comprising:
    a substrate;
    a titanium aluminumn underlayer supported by the substrate, wherein the underlayer has a $L1_0$ lattice structure or a disordered fcc lattice structure; and
    a cobalt alloy magnetic layer on and in contact with the underlayer, wherein the magnetic layer has perpendicular magnetization.

12. The magnetic recording medium as defined by claim 11 wherein the underlayer is on and in contact with the substrate, and the substrate is NiP.

13. The magnetic recording medium as defined by claim 11 wherein the underlayer is on and in contact with the substrate, and the substrate is glass.

14. The magnetic recording medium as defined by claim 11 wherein the underlayer has a $L1_0$ lattice structure.

15. The magnetic recording medium as defined by claim 11 wherein the underlayer has a disordered fcc lattice structure.

16. The magnetic recording medium as defined by claim 11 wherein the underlayer has a thickness of about 20 to 300 angstroms.

17. The magnetic recording medium as defined by claim 11 wherein the underlayer has a thickness of about 20 to 160 angstroms.

18. The magnetic recording medium as defined by claim 11 wherein the underlayer has a thickness of about 20 to 80 angstroms.

19. The magnetic recording medium as defined by claim 11 wherein the underlayer has a thickness of about 20 to 40 angstroms.

20. The magnetic recording medium as defined by claim 11 wherein the underlayer facilitates a (0002) orientation of the magnetic layer.

21. The magnetic recording medium as defined by claim 11 wherein the underlayer increases a perpendicular coercivity in the magnetic layer by at least 400 oersteds.

22. The magnetic recording medium as defined by claim 11 wherein the magnetic layer is CoCrTaPt.

23. The magnetic recording medium as defined by claim 11 wherein the magnetic layer is CoCrPtB.

24. The magnetic recording medium as defined by claim 11 wherein the magnetic layer has a (0002) orientation.

25. The magnetic recording medium as defined by claim 11 wherein a carbon protective layer is on and in contact with the magnetic layer.

26. The magnetic recording medium as defined by claim 11 wherein a carbon protective layer is on and in contact with the magnetic layer, and a lubricant layer is on and in contact with the carbon protective layer.

27. The magnetic recording medium as defined by claim 11 wherein the medium is devoid of a non-magnetic layer of chromium or chrome alloy beneath the magnetic layer.

28. The magnetic recording medium as defined by claim 11 wherein the medium is devoid of a magnetic soft layer beneath the magnetic layer.

29. The magnetic recording medium as defined by claim 11 wherein the medium is devoid of a NiFe layer beneath the magnetic layer.

30. The magnetic recording medium as defined by claim 11 wherein the medium is devoid of a non-magnetic layer of chromium or chrome alloy beneath the magnetic layer and is devoid of a magnetic soft layer beneath the magnetic layer.

31. A magnetic recording medium, comprising:
    a substrate;
    a titanium aluminum underlayer supported by the substrate; and
    a cobalt alloy magnetic layer on and in contact with the underlayer, wherein the underlayer facilitates a (0002) orientation and induces perpendicular magnetic anisotropy in the magnetic layer, a perpendicular remanence of the magnetic layer is at least ten times an in-plane remanence of the magnetic layer, and a perpendicular coercivity of the magnetic layer is at least 5 times an in-plane coercivity of the magnetic layer.

32. The magnetic recording medium as defined by claim 31 wherein the underlayer is on and in contact with the substrate, and the substrate is NiP.

33. The magnetic recording medium as defined by claim 31 wherein the underlayer is on and in contact with the substrate, and the substrate is glass.

34. The magnetic recording medium as defined by claim 31 wherein the underlayer has a $L1_0$ lattice structure.

35. The magnetic recording medium as defined by claim 31 wherein the underlayer has a disordered fcc lattice structure.

36. The magnetic recording medium as defined by claim 31 wherein the underlayer has a thickness of about 20 to 300 angstroms.

37. The magnetic recording medium as defined by claim 31 wherein a carbon protective layer is on and in contact with the magnetic layer, and a lubricant layer is on and in contact with the carbon protective layer.

38. The magnetic recording medium as defined by claim 31 wherein the medium is devoid of a non-magnetic layer of chromium or chrome alloy beneath the magnetic layer.

39. The magnetic recording medium as defined by claim 31 wherein the medium is devoid of a magnetic soft layer beneath the magnetic layer.

40. The magnetic recording medium as defined by claim 31 wherein the medium is devoid of a non-magnetic layer of chromium or chrome alloy beneath the magnetic layer and is devoid of a magnetic soft layer beneath the magnetic layer.

41. A magnetic recording medium, comprising:
    a substrate;
    a non-magnetic underlayer supported by the substrate, wherein the underlayer has a $L1_0$ lattice structure or a disordered fcc lattice structure; and
    a cobalt alloy magnetic layer on and in contact with the underlayer, wherein the magnetic layer has perpendicular magnetization.

42. The magnetic recording medium as defined by claim 41 wherein the underlayer is on and in contact with the substrate, and the substrate is NiP.

43. The magnetic recording medium as defined by claim 41 wherein the underlayer is on and in contact with the substrate, and the substrate is glass.

44. The magnetic recording medium as defined by claim 41 wherein the underlayer has a $L1_0$ lattice structure.

45. The magnetic recording medium as defined by claim 41 wherein the underlayer has a disordered fcc lattice structure.

46. The magnetic recording medium as defined by claim 41 wherein the underlayer has a thickness of about 20 to 300 angstroms.

47. The magnetic recording medium as defined by claim 41 wherein the underlayer has a thickness of about 20 to 160 angstroms.

48. The magnetic recording medium as defined by claim 41 wherein the underlayer has a thickness of about 20 to 80 angstroms.

49. The magnetic recording medium as defined by claim 41 wherein the underlayer has a thickness of about 20 to 40 angstroms.

50. The magnetic recording medium as defined by claim 41 wherein the underlayer facilitates a (0002) orientation of the magnetic layer.

51. The magnetic recording medium as defined by claim 41 wherein the underlayer increases a perpendicular coercivity in the magnetic layer by at least 400 oersteds.

52. The magnetic recording medium as defined by claim 41 wherein the magnetic layer is CoCrTaPt.

53. The magnetic recording medium as defined by claim 41 wherein the magnetic layer is CoCrPtB.

54. The magnetic recording medium as defined by claim 41 wherein the magnetic layer has a (0002) orientation.

55. The magnetic recording medium as defined by claim 41 wherein a carbon protective layer is on and in contact with the magnetic layer.

56. The magnetic recording medium as defined by claim 41 wherein a carbon protective layer is on and in contact with the magnetic layer, and a lubricant layer is on and in contact with the carbon protective layer.

57. The magnetic recording medium as defined by claim 41 wherein the medium is devoid of a non-magnetic layer of chromium or chrome alloy beneath the magnetic layer.

58. The magnetic recording medium as defined by claim 41 wherein the medium is devoid of a magnetic soft layer beneath the magnetic layer.

59. The magnetic recording medium as defined by claim 41 wherein the medium is devoid of a NiFe layer beneath the magnetic layer.

60. The magnetic recording medium as defined by claim 41 wherein the medium is devoid of a non-magnetic layer of chromium or chrome alloy beneath the magnetic layer and is devoid of a magnetic soft layer beneath the magnetic layer.

61. A magnetic recording medium, comprising:
    a substrate;
    a non-magnetic underlayer supported by the substrate, wherein the underlayer has a $L1_0$ lattice structure or a disordered fcc lattice structure; and
    a cobalt alloy magnetic layer on and in contact with the underlayer, wherein the underlayer facilitates a (0002) orientation and induces perpendicular magnetic anisotropy in the magnetic layer, a perpendicular remanence of the magnetic layer is at least ten times an in-plane remanence of the magnetic layer, and a perpendicular coercivity of the magnetic layer is at least 5 times an in-plane coercivity of the magnetic layer.

62. The magnetic recording medium as defined by claim 61 wherein the underlayer is on and in contact with the substrate, and the substrate is NiP.

63. The magnetic recording medium as defined by claim 61 wherein the underlayer is on and in contact with the substrate, and the substrate is glass.

64. The magnetic recording medium as defined by claim 61 wherein the underlayer has a $L1_0$ lattice structure.

65. The magnetic recording medium as defined by claim 61 wherein the underlayer has a disordered fcc lattice structure.

66. The magnetic recording medium as defined by claim 61 wherein the underlayer has a thickness of about 20 to 300 angstroms.

67. The magnetic recording medium as defined by claim 61 wherein a carbon protective layer is on and in contact with the magnetic layer, and a lubricant layer is on and in contact with the carbon protective layer.

68. The magnetic recording medium as defined by claim 61 wherein the medium is devoid of a non-magnetic layer of chromium or chrome alloy beneath the magnetic layer.

69. The magnetic recording medium as defined by claim 61 wherein the medium is devoid of a magnetic soft layer beneath and magnetic layer.

70. The magnetic recording medium as defined by claim 61 wherein the medium is devoid of a non-magnetic layer of chromium or chrome alloy beneath the magnetic layer and is devoid of a magnetic soft layer beneath the magnetic layer.

* * * * *